United States Patent [19]

Martin, Jr.

[11] 4,187,070
[45] Feb. 5, 1980

[54] BLOW MOLDING MACHINE
[75] Inventor: Merritt W. Martin, Jr., Saline, Mich.
[73] Assignee: Roman Machine Co., Milan, Mich.
[21] Appl. No.: 890,626
[22] Filed: Mar. 20, 1978
[51] Int. Cl.² ............................................ B29C 17/07
[52] U.S. Cl. .................................. 425/525; 264/533; 425/526; 425/527; 425/535
[58] Field of Search ............... 264/98, 99, 163, 533; 425/525, 527, 531, 535, 812, 526

[56] References Cited

U.S. PATENT DOCUMENTS

| | | | |
|---|---|---|---|
| 3,209,401 | 10/1965 | Mehnert | 425/531 X |
| 3,718,724 | 2/1973 | Holzmann et al. | 264/98 |
| 3,782,877 | 1/1974 | Mehnert | 425/531 |
| 3,862,817 | 1/1975 | Dahlberg | 264/163 X |
| 4,123,218 | 10/1978 | Krall | 425/535 |

*Primary Examiner*—Jan H. Silbaugh
*Attorney, Agent, or Firm*—Harness, Dickey & Pierce

[57] ABSTRACT

A construction for neck forming in a blow molding machine of the type having a retractable blow pin at a station separate from the parison extruding station. The construction results in a clean, non-fuzzy neck edge requiring no subsequent cleaning operation, and facilitating stripping of the product from the blow pin. The machine comprises a floating hardened shear ring as part of the blow pin assembly which has an interference fit with flared hardened inserts on the neck portion of the mold halves, thus creating a sharply defined upper neck edge. Means are provided for momentarily releasing downward pressure on the blow pin assembly as the mold halves are being retracted to prevent damage to the inserts. The blow pin assembly incorporates a self-centering arrangement for this shear ring and a controlled compressed air leakage system which cools and spreads the hot flash in the vicinity of the blow pin.

7 Claims, 3 Drawing Figures

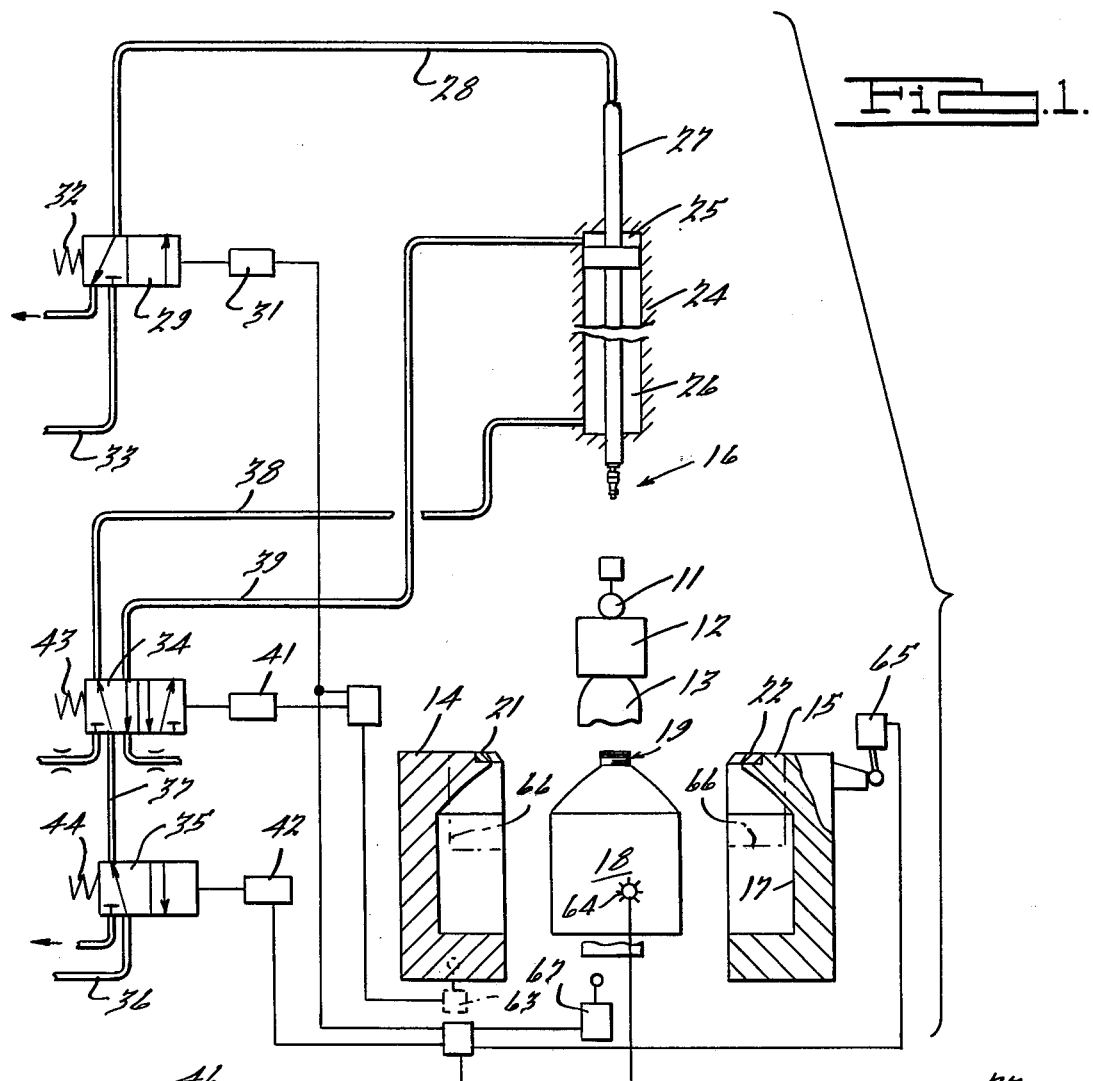
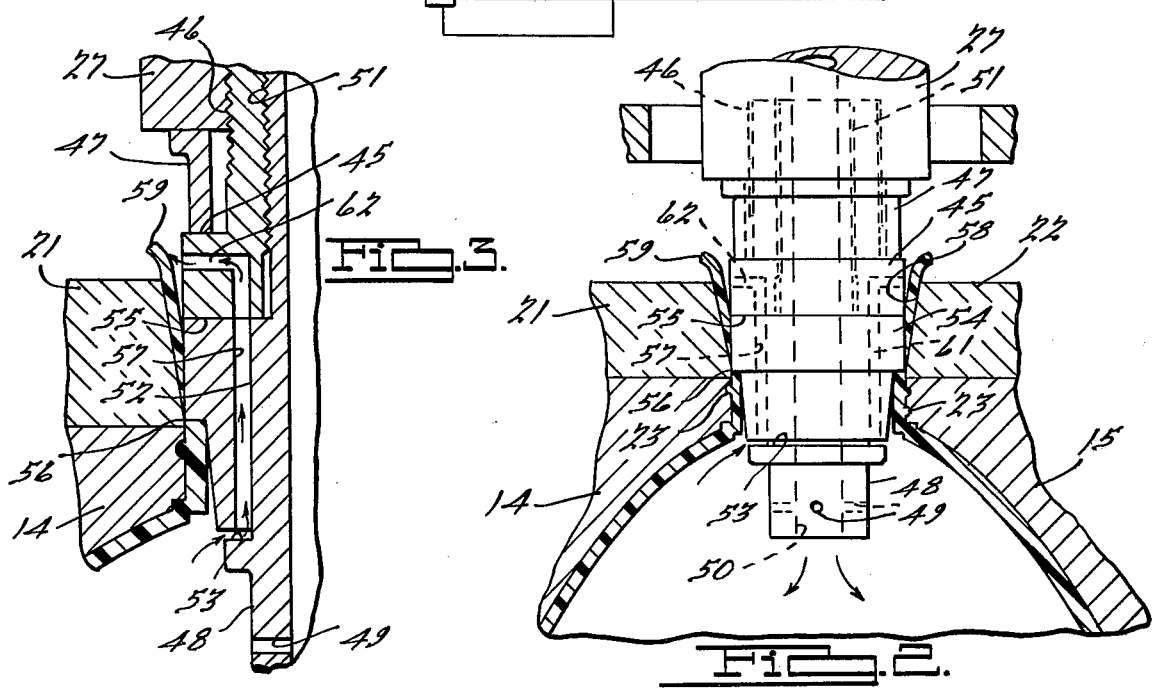

4,187,070

BLOW MOLDING MACHINE

BACKGROUND OF THE INVENTION

1. Field of the Invention

The invention relates to blow molding machines of the type in which tubular parison of plastic material is continually extruded at one station, mold halves for a necked product such as bottle closing around the parison which is severed from the extruder and carried by the mold halves to a blow molding station. At this station a blow pin assembly is lowered against the mold halves to form the neck portion of the product and force compressed air into the parison. The invention is particularly concerned with formation of the neck edge and control of the hot flash thereabove.

2. Description of the Prior Art

U.S. Pat. No. 3,470,582 shows a construction for compacting and trimming necks in blow molded containers. In this construction, the blow pin has a shoulder which enters a cylindrical surface on the mold sections. Inevitably, a slight clearance must exist between this blow pin and surface resulting in a burred or fuzzy neck edge. This must eventually be trimmed and reamed at a separate station, often resulting in the inadvertent deposit of resin particles in the bottle.

BRIEF SUMMARY OF THE INVENTION

It is the object of the present invention to provide a novel and improved blow molding machine in which the neck compacting and trimming structure trims the bottle neck in a clean fashion at the molding station without the necessity of providing transportion to a separate trimming machine and eliminating the separate trimming operation.

It is a further object to provide an improved blow molding machine of this nature which greatly reduces the cost of construction and operation by not only eliminating the need for transfer equipment and a separate trimming station but as a result reducing the required floor space.

It is another object to provide an improved blow molding machine neck forming construction of the above nature which minimizes the likelihood of damage to the equipment and particularly the mold sections when the formed product is released, while at the same time insuring consistent part size in successive molded products.

It is still another object to provide a novel and improved blow molding machine having means for preventing the hot flash in the neck area from interfering with stripping of the part, while at the same time enhancing the cooling of the product and portions of the neck forming assembly.

Briefly, the invention in one form comprises a blow molding machine for a product such as a bottle having a neck, comprising a pair of mold sections which together form a cavity and at their upper ends an annular blow pin receiving surface, said surface being flared outwardly in the direction of the blow pin assembly, and a blow pin assembly having a lower portion adapted to fit within said mold cavity so as to form the inside surface of the product neck, a wider portion on said blow pin assembly above said lower portion, and a sharp shoulder between said portions, the diameter of said shoulder being such that when said blow pin assembly enters said flared surface the outer edge of said shoulder will engage said flared surface with an interference fit, thereby completely severing the neck portion of the product from the flash thereabove.

In another aspect, the neck forming system of this invention comprises a blow molding machine blow pin assembly having a blow pin with a central air passage leading to the mold cavity, an adapter to which said blow pin is secured, said adapter being mounted on a blow pin assembly actuator, a shear ring carried by said blow pin, said shear ring surrounding the blow pin and having limited lateral movement with respect thereto, mold sections forming a surface which surround said blow pin, said surface being flared in the direction of said adapter, and a shoulder on said shear ring having an interference fit with an intermediate portion of said flared surface. The adapter and blow pin have facing shoulders between which said shear ring is disposed, the dimensions of the parts being such that clearance for compressed air leakage is present between the shoulder on said blow pin and said shear ring, whereby compressed air may leak therethrough and upwardly through an annular space which is present between the blow pin and shear ring, and air passages in said adapter leading said leaked compressed air radially outwardly, whereby the compressed air will impinge on hot flash located inside said flared surface above said interference fit.

BRIEF DESCRIPTION OF THE DRAWINGS

FIG. 1 is a schematic view showing the fluid controls for the blow pin assembly actuator as well as the coaction with the mold sections;

FIG. 2 is an enlarged fragmentary view partially in cross section showing the construction of the blow pin assembly and its coaction with the flared mold section surface as well as the neck portion of the product; and FIG. 3 is a cross-sectional enlargement of a portion of FIG. 2.

DESCRIPTION OF THE PREFERRED EMBODIMENT

FIG. 1 shows portions of a continuous extrusion type of blow molding machine having an extruder 11 leading to a die head 12 from which is continuously extruded a tubular parison 13 of expandable plastic material. A pair of mold sections 14, 15 are mounted for reciprocating movement toward and away from each other on opposite sides of parison 13 and are also supported for reciprocating movement in unison into and out of the paper of FIG. 1, that is, between the parison extruding station and a blow molding station at which a blow pin assembly generally indicated at 16 is present. Conventionally, the mold sections 14, 15 close around the extruded parison which is then severed from die head 12, the closed mold sections carrying the parison to the blow molding station at which point blow pin assembly 16 descends and permits compressed air to force the parison against the mold cavity 17 formed by sections 14, 15. The present invention is particularly concerned with a mold cavity for a product such as a bottle 18 having a neck portion generally indicated at 19. In such cases, the mold sections conventionally are provided with hardened inserts 21, 22 for cooperation with the blow pin assembly. As shown in the aforementioned patent, the blow pin assembly is intended not only to permit compressed air to be delivered to the parison but also to compact the plastic material in the vicinity of portion 19 so as to form the neck including conventional cap threads 23 thereon.

A reciprocating fluid motor 24 is used to move blow pin assembly 16 up and down between its retracted and extended positions. This is in the form of a double acting fluid motor having an upper chamber 25 and lower chamber 26. The piston rod 27 is hollow in order to carry compressed air from a line 28 to the blow pin assembly which is secured to the lower end of the piston rod. A three-way valve 29 is placed in line 28 and is shiftable by a solenoid 31. When the solenoid is deenergized a spring 32 will hold valve 29 in its exhaust position as shown, whereas energization of solenoid 31 will move the valve to its supply position in which air from a supply line 33 will be connected to the blow pin assembly.

Fluid to chambers 25 and 26 is controlled by valves 34 and 35. A source of fluid pressure 36 is connected to valve 35 which in turn is connected to valve 34 by a line 37. One outlet port of valve 34 is connected to the lower chamber 26 by a line 38, and the other port is connected to the upper chamber 25 by a line 39. Valves 34 and 35 are controlled by solenoids 41 and 42 respectively and are urged toward their normal positions when the solenoids are deenergized by springs 43 and 44 respectively. When in those positions, as shown in FIG. 1, chamber 26 will be compressed and chamber 25 exhausted so that the blow pin assembly is retracted.

FIGS. 2 and 3 show the construction of blow pin assembly 16. The assembly is secured to the lower end of piston rod 27 by an adapter 45 which has a threaded portion 46 mounted in the piston rod. A spacer 47 is disposed between the upper end of the adapter and the lower end of the piston rod. The blow pin 48 itself has a lower end with radial ports 49 and axial port 50, a threaded upper end 51 mounted within adapter 45, and a cylindrical central portion 52, with an upwardly facing shoulder 53 between portions 48 and 52.

A shear ring 54 is disposed between the shoulder 55 formed by the underside of adapter 45 and shoulder 53 of the blow pin. The upper portion of shear ring 54 is cylindrical, with a sharp lower corner 56. The lower portion of the shear ring is somewhat narrower than the upper portion so as to fit within neck portion 19 of the bottle.

The internal diameter 57 of shear ring 54 is somewhat wider than the diameter of blow pin portion 52. Moreover, a slight clearance exists between shoulders 53 and 55 and shear ring 54, so that the shear ring may shift laterally a limited distance. The shear ring will thus have a self-centering action when the blow pin assembly descends.

Inserts 21 and 22 together form a circular recess 58. This recess is flared in an upward direction, and the diameter is such that shoulder 56 of shear ring 54 will have an interference fit with the lower portion of recess 58. This will mean that the upper edge of bottle neck portion 19 will be cleanly finished with the hot flash 59 thereabove being severed from the bottle neck.

Means are provided for controlled leakage of compressed air from cavity 17 through the blow pin assembly. This means comprises the above mentioned clearance between shear ring 54 and shoulders 53 and 55, plus the annular space 61 between the shear ring and the main portion of blow pin 48. Compressed air leaking upwardly as shown by the arrows through these passages will lead radially outwardly by a plurality of L-shaped passages 62 formed in adapter 45. This flow of air will serve the purpose of cooling the hot flash 59 and forcing it away from the blow pin assembly, thus preventing it from sticking to this assembly and facilitating stripping of the bottle away from the blow pin assembly. The flow of air will also accomplish an air exchange within the bottle, serving to cool the product, and will also cool the floating hardened shear ring 54 as it passes upwardly through passage 61.

In operation of the system shown in FIGS. 1 and 2, assuming an initial condition in which mold sections 14, 15 have closed around an extruded parison 13 and have advanced to the blow molding station, a limit switch 63 will be actuated to energize solenoid 41 and shift valve 34, thus causing chamber 25 of fluid motor 24 to be pressurized so as to cause blow pin assembly 16 to descend into its FIG. 2 position. Solenoid 31 will also be energized to shift valve 29 to a position applying blow pressure to the blow pin assembly, thus expanding the parison against the mold cavity. The product will be formed, including the neck portion 19 which will be compacted and trimmed by the above described action in which edge 56 of self-centering shear ring 54 engages tapered surface 58 of inserts 21 and 22 with an interference fit.

During this pressurization phase of the cycle, some compressed air will leak through the blow pin assembly at a controlled rate along the path described above, including passages 61 and 62. This bleed off air system will accomplish the purposes of cooling and spreading outwardly the hot flash 59 as well as enhancing cooling of the product by air exchange, and also cooling the hardened shear ring 54.

Upon receipt of a signal solenoid 31 will be deenergized to exhaust the compressed air from the product and then open the mold sections. The signal may be for example from a sensor such as an electric eye 64 which is at the parison extrusion station and detects the arrival of the bottom of the extruded parison at a certain position, preparatory to the next pick-up by the mold sections. This signal may simultaneously energize solenoid 42, shifting valve 35 and thus exhausting pressurized fluid from upper chamber 25 of fluid motor 24. It should be noted that solenoid 41 will remain energized at this time so that both chambers 25 and 26 will be exhausted. Thus, no downward pressure will be exerted on blow pin assembly 16 as mold sections 14, 15 are opened. Were downward pressure to be maintained at this time, there would be the danger of damage caused to the mold section inserts 21 and 22. This is because, as the molds begin to open, surface 58 would increase its diameter in one direction but not in a transverse direction, and the interference fit with shear ring edge 56 could then cause damage to the insert corners. The above described arrangement for preventing unwanted descent of the blow pin assembly is believed superior to a mechanical stop which would inevitably be subject to some yielding movement.

Opening of mold sections 14, 15 will leave finished product 18 hanging on blow pin assembly 16 by friction. When the mold sections reach their open positions, a limit switch 65 will be actuated. This will cause solenoid 42 to be deenergized, reapplying pressure to fluid motor chamber 25, it being safe to do so at this time because the mold sections have been completely retracted. The mold sections will be returned to the parison station to pick up the next parison, and will close on the new parison. Trimming and transfer means shown in dot-dash lines at 66 in FIG. 1 are attached to and movable with mold sections 14, 15, and as the mold sections close upon the new parison, this means 66 will close upon the formed product 18 for trimming and transport purposes. Although this means 66 in itself does not form part of the present invention, it is described in order to complete the description of the cycle. A limit switch 67 will sense closure of means 66 on the formed product and thereupon deenergize solenoid 41 to pressurize lower chamber 26 and exhaust chamber 25 of the fluid motor. This will retract blow pin assembly 16 upwardly.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A blow molding machine for a product such as a bottle having a neck, comprising a pair of mold sections which together form a cavity and at their upper ends an annular blow pin assembly receiving surface, said surface being flared upwardly in the direction of the blow pin assembly, and a downwardly extending blow pin assembly above said mold sections having actuating means for moving it downwardly to enter said flared surface and a lower portion adapted to fit within said mold cavity so as to form the inside surface of the product neck, a wider portion on said blow pin assembly above said lower portion, and a sharp shoulder between said portions, the diameter of said shoulder being such that when said blow pin assembly enters said flared surface the outer edge of said shoulder will engage said flared surface with an interference fit, thereby completely severing the neck portion of the product from the flash thereabove, said blow pin assembly further comprising a blow pin having a central compressed air passage, and a shear ring mounted on said blow pin for limited lateral movement, the internal diameter of said shear ring being sufficiently wider than the blow pin diameter to permit the shear ring to have a self-centering action when the blow pin assembly descends, means longitudinally retaining said shear ring on said blow pin so as to permit said self-centering action, said shoulder being formed on said shear ring.

2. The combination according to claim 1, said blow pin assembly further comprising an adapter member, said blow pin being attached to said adapter member, an actuator for said blow pin, said adapter member being secured to one end of said actuator, said shear ring being disposed between facing shoulders on said adapter and blow pin.

3. The combination according to claim 2, further provided with sufficient clearance between the shear ring and said blow pin to permit leakage of compressed air from the interior of the product being molded past said shear ring, and air passages in said adapter leading said compressed air radially outwardly against the hot flash surrounding said blow pin assembly above said shear ring shoulder.

4. The combination according to claim 2, said shear ring shoulder being at an intermediate portion thereof, the portion of said shear ring below said shoulder being formed so as to coact with material on the inside of the product neck.

5. A blow molding machine comprising a pair of mold sections forming a mold cavity, a blow pin assembly above said mold sections having a blow pin with a central air passage leading downwardly to the mold cavity, an adapter to which said blow pin is secured, said adapter being mounted on a blow pin assembly actuator, a shear ring carried by said blow pin, said shear ring surrounding the blow pin and having limited lateral movement with respect thereto, the internal diamater of said shear ring being sufficiently wider than the blow pin diameter to permit the shear ring to have a self-centering action when the blow pin assembly descends, means longitudinally retaining said shear ring on said blow pin so as to permit said self-centering action, said mold sections forming a surface which surrounds said blow pin when the mold and blow pin assembly are engaged, said surface being flared upwardly in the direction of said adapter, and a shoulder on said shear ring having an interference fit with an intermediate portion of said flared surface when the mold and assembly are engaged.

6. The combination according to claim 5, the adapter and blow pin having facing shoulders between which said shear ring is disposed, the dimensions of the parts being such that clearance for compressed air leakage is present between the shoulder on said blow pin and said shear ring, whereby compressed air may leak therethrough and upwardly through an annular space which is present between the blow pin and shear ring.

7. The combination according to claim 6, further provided with air passages in said adapter leading said leaked compressed air radially outwardly, whereby the compressed air will impinge on hot flash located inside said flared surface above said interference fit.

* * * * *